United States Patent Office

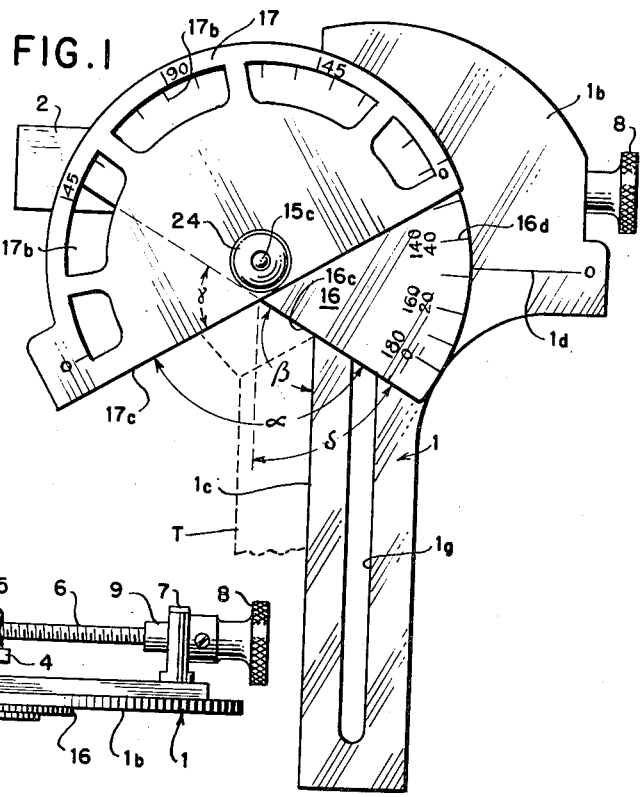
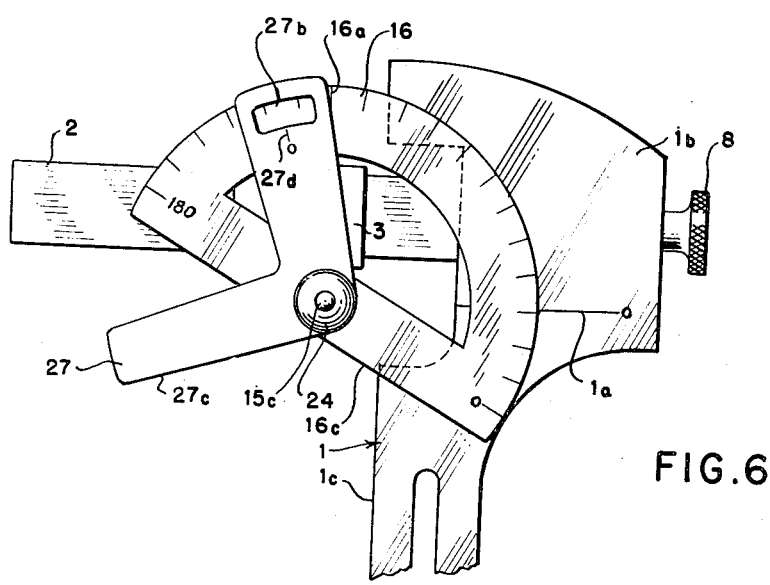

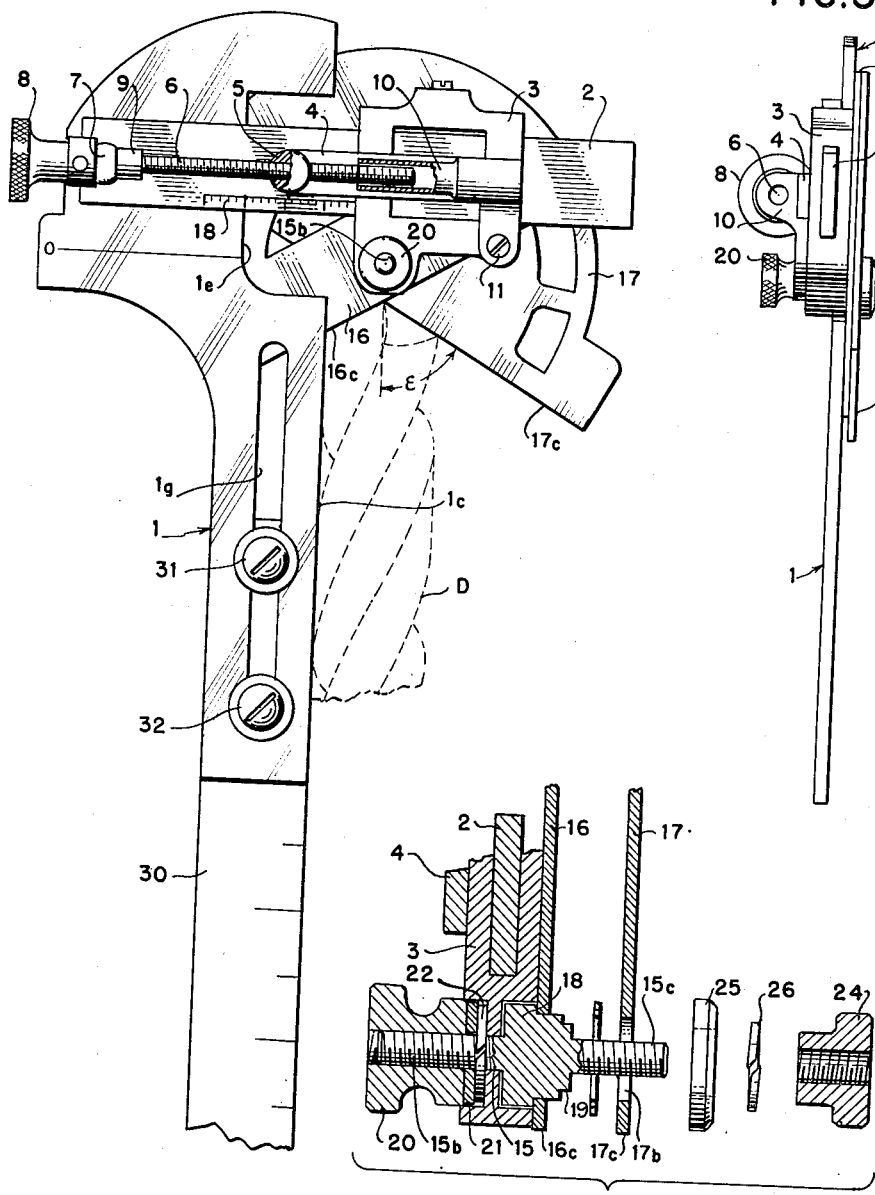

2,778,122
Patented Jan. 22, 1957

2,778,122

TOOL GAUGE

Wladyslaw Oleksin, Brooklyn, N. Y.

Application January 19, 1955, Serial No. 482,735

5 Claims. (Cl. 33—201)

My invention relates to gauges for the checking and grinding of cutting tools such as tool bits for lathe work, planing and milling, or the cutting tip of drills.

The accurate maintenance of proper angles at the cutting portion of such tools is an important requirement for modern mass production regardless of the material— tool steel, high-speed steel, cast alloy, sintered carbide, diamond—of which the tool is made. This applies especially to the cutting and clearance angles that provide a passage for chips at those places where the tool is not actually in cutting engagement with the work piece. Thus, it is often important to measure side cutting-edge angles, end cutting-edge angles and front clearance angles when sharpening single-pointed tool-bits for lathes, screw machines, boring mills, shapers or planers. Similarly, a checking of drills for proper lip angles is required. For optimum performance, these angles may have to be given various magnitudes depending upon the particular kind of tool, tool material and work material.

It is an object of my invention to provide a tool gauge which not only affords the checking of angular relations of the kind above mentioned but is also suitable for use with various cutting-tool bits and various drills.

Another object of the invention is to permit setting the gauge to a plurality of different and individually adjustable angles relative to the shank axis or equivalent reference line of the tool and to also set the gauge to any desired spacing of the tool-tip point from that reference line, so that all these checks can be made at a single glance simply by placing the tool and the gauge into a single position against each other.

To achieve this versatility of adjustment and application with a multi-use gauge according to my invention, I provide the gauge with a preferably flat body structure having a planar front face and forming a straight ruler edge along which the tool being checked is to be placed. A slide bar, rigidly joined or integral with the body structure to form part thereof, extends parallel to the front face in transverse relation to the ruler edge and carries a slider with pivot means which define a pivot axis perpendicular to the front face of the body structure. The spacing of the pivot axis from the ruler edge thus depends upon the chosen setting of the slider along the slide bar and, as will be explained, defines the proper position of the tool-bit point. A flat member, preferably shaped as a protractor, is mounted on the slide in face-to-face relation to the front face of the body structure and has a straight edge that can be placed at any desired angle relative to the first-mentioned edge by rotational adjustment of the protractor about the pivot axis of the slider. Another movable member defining a third straight edge and consisting of another protractor or simply of an arm, is mounted on the slider in front of the first-mentioned protractor and is likewise adjustable about the pivot axis of the slider to place the third edge in any desired angular position relative to the ruler edge.

These and other features of my invention, as well as examples of its use and the advantages afforded thereby, will be apparent from the following description in conjunction with the embodiments exemplified on the drawings in which:

Fig. 1 is a front view of a multi-use gauge showing a lathe tool bit being checked;

Fig. 2 is a rear view of the same gauge differently set and in use for checking a drill;

Fig. 3 is a lateral view from the right of Fig. 2;

Fig. 4 is a top view;

Fig. 5 is a section through part of the same gauge, the section being taken along the line V—V in Fig. 4 and some of the elements being shown disassembled; and Fig. 6 is a front view of another embodiment of the gauge.

The gauge illustrated in Figs. 1 through 5 comprises a body structure 1 of flat shape. The surface denoted by $1b$ in Figs. 1, 3, 4 and, 6 is hereinafter called the "front face" for reference purposes. The lower portion of the body structure 1 may serve as a handle and forms a ruler with a straight edge $1c$ against which the tool being checked is to be placed, as is shown in Fig. 1 for a tool bit T and in Fig. 2 for a drill D. A straight slide bar 2 of rectangular cross section is rigidly joined or integral with the body structure 1 to form part thereof. The slide bar 2 extends at a right angle to the ruler edge $1c$ and in parallel relation to the front face $1b$ of the body structure.

A slider 3, displaceably seated on slide bar 2, has a laterally extending member 4 which carries a stud 5. A threaded bore of stud 5 is in engagement with a micrometer or other screw spindle 6. The spindle extends parallel to the slide bar 2 and is journalled in a bearing stud 7 rigidly mounted on the slide bar 2. A knurled knob 8 is secured to the end of spindle 6, and a ring 9 on spindle 6 prevents it from axial displacement relative to the stud 7. Revolution of spindle 6 by operation of the knob 8 causes the slider 3 to travel along the slide bar 2. A sleeve 10 secured to the slider 3 by means of a screw 11 surrounds the free end of the spindle 6. The bore of sleeve 10 has a diameter larger than that of spindle 6 so that there is no threaded engagement between sleeve and spindle, the sleeve 10 serving merely to protect the spindle from damage.

A pivot pin 15 traverses a bore through a downwardly extending projection of slider 3. The axis of pivot pin 15 extends at a right angle to the place of front face $1b$. Revolvably seated on spindle 15 are two flat members 16 and 17, both shaped like protractors and of substantially semicircular shape. The protractor 16 has a straight edge $16c$ that extends parallel to the 0–180° diameter of the protractor. Member 17 has a similar straight edge $17c$.

The protractor 16 has its center bore seated upon an annular shoulder of a member 18 integral with pin 15 and is brazed to the member 18 so as to be rigidly secured to the spindle 15. A knurled knob is in threaded engagement with the rear end $15c$ of spindle 15. When knob 20 is loosened, the protractor 16 can be rotationally adjusted to any desired angular position. To this end, the protractor 16 has on its front face a scale $16d$ of angular indicia from 0–180°, and the front face $1b$ of the body structure has a reference line $1d$ for indicating on the protractor scale the angle to which the protractor is set. When set to the proper position, the protractor 16 can be fastened by tightening the knob 20 (Fig. 5). Knob 20 then acts upon a washer 21 and a lock washer 22 to prevent the protractor 16 from moving relative to the front face of the slider 3.

The member 17, also in the shape of a protractor, is rotatably seated on the shoulder portion of member 18 and can be placed to any desired angular position relative to the protractor 16 by placing a reference mark of member 17 into registry with the proper angular value of protractor scale 16d. Member 17 has a number of openings 17b through which the scale 16d is visible. When placed in the proper angular position, the protractor member 17 is secured by means of a knob 24 which is in threaded engagement with the front end 15c of pivot pin 15. When tightened, the knob 24 exerts pressure against the protractor member 17 through an intermediate washer 25 and a lock washer 26. The intermediate washer 25 is then seated upon another shoulder 19 of member 18.

The handle-and-ruler portion of the body structure is preferably provided with an elongated slot 1g to permit attaching an extension ruler 30 by means of screws 31, 32 when the gauge is to be used for checking drills or other tools of great length.

It will be apparent that the pivot axis of pin 15 can be set to any desired spacing from the ruler edge 1c. If desired, the body structure or slide bar 2 of the gauge may be provided with a scale as shown in Fig. 2 at 18 for indicating the selected spacing. The second edge 16c can be set to any desired angle relative to the ruler edge 1c by placing and fastening the protractor 16 in the corresponding angular position, this position being indicated by the zero reference line 1d in cooperation with the scale 16d (Fig. 1). The third edge 17c can likewise be placed and fastened in any desired angular position relative to edges 1c and 16c, that position being indicated by the reference indicium of member 17 relative to the scale 16d.

In consequence, the gauge can be set to indicate various degrees of offset and various angular relations best suited for particular working conditions. One of the available uses of the gauge is exemplified in Fig. 1 with reference to a tool bit for lathe, planar or shaping work. The shank of the tool bit T is placed against the ruler edge 1c of the gauge. The tool bit can then be checked with respect to the following data: The proper location of the point of the tool is determined by the setting of the slider 3. The angle denoted by $\alpha$ (Fig. 1) indicates the proper nose angle at the point of the tool bit. The angle $\beta$ indicates the proper shank angle. The angle $\gamma$ is the side cutting angle. The angle $\delta$ is the end cutting edge angle. Consequently, the gauge can be pre-set in accordance with the particular angular relations available from the manufacturers' instructions. It will be recognized that the same gauge can be used for gauging the end relief angle, lip angle and back rake angle of the same or similar tool bits, provided the tool bit is placed with its back against the ruler edge 1c and the gauge is pre-set in accordance with the particular angles to be measured.

For gauging the proper lip angles of a drill such as the drill shown at D in Fig. 2, the slider 3 is set in accordance with the diametric size of the drill, and the two protractor members 16 and 17 are set so that each corresponds to the same lip angle $\epsilon$, this angle being the same for both cutting lips. It will be apparent that the gauge can be used for various sizes of drills and for checking not only the standard lip angle of 59° but also any larger or smaller angle that may be best suited for any particular tool or work material.

The gauge can be used for measuring the cutting angles of drills with one carbide cutting tip, such as small-size drills of the solid carbide type and larger drills with one brazed carbide cutting tip and two carbide wear-strips located at 90° and 183° behind the cutting edge respectively. The advantages of versatile and accurate adjustment of the gauge are particularly outstanding for all-depth carbide drills whose successful use depends upon the provision and maintenance of correct cutting and relief angles according to the tables of data supplied by the carbide drill manufacturers.

The gauge can further be used for measuring countersinks during grinding to any desired angle such as 82°, 90°, 100° or others. It may further be used as a bevel protractor from 0° to 90°.

The foregoing description and the recited modes of application and advantages are also applicable to the modified gauge illustrated in Fig. 6. This gauge differs from that of Figs. 1 to 5 in that the substantially semi-circular member 17 is substituted by an arm 27 of angular shape. The flat arm 27 has a zero reference mark 27d for indicating the angular setting of arm 27 on the scale 16d of the protractor member 16. The scale 16d is visible through an opening 27b of arm 27.

While in the foregoing a full angular scale from 0 to 180° is provided on the protractor member 16, such a scale may also be located on the front face 1b of the body structure 1 so that both pivotally-displaceable members may consist of arm structures each having one or several reference marks to coact with the angular scale of the body structure.

It will, therefore, be apparent to those skilled in the art, upon a study of this disclosure, that my invention permits of various modifications and may be embodied in designs other than those specifically illustrated and described, without departing from the essence of my invention and within the scope of the claims annexed hereto.

I claim:

1. A tool-bit gauge, comprising an elongated planar body structure forming a handle and having a straight first edge parallel to its longitudinal direction, a bar rigidly joined with said structure and extending transverse to said first edge, a slider mounted on said bar and having pivot means defining a pivot axis perpendicular to the plane of said structure, said slider being displaceable along said bar for setting said pivot axis to a desired spacing from said first edge, a flat member disposed in parallel relation to the plane of said structure and in face-to-face relation to said structure, said flat member having a straight second edge and being pivotally mounted on said pivot means of said slider for angular adjustment of said second edge about said pivot axis to a desired angular position relative to said first edge, and another member having a straight third edge and being mounted on said slider in face-to-face relation to said first-mentioned member, said other member being pivotally adjustable about said pivot axis for setting said third edge to a desired angular position relative to said second edge.

2. A tool-bit gauge, comprising a rigid base structure having planar front face and having a straight first edge in the plane of said front face, said structure having a bar extending transverse to said first edge and forming a straight slide way perpendicular to said first edge, a slider displaceable on said bar along said slide way, a screw spindle connecting said base structure and said slider, said spindle being revolvable for displacing said slider, said slider having a pivot pin defining a pivot axis perpendicular to the front-face plane of said base structure, a protractor pivotally mounted on said pivot pin in parallel relation and adjacent to said front face, said protractor having a center on said pivot axis, said protractor having a straight second edge and said structure having a reference mark correlated with said protractor for setting said second edge to a desired angular position relative to said first edge, and a member having a straight third edge and being mounted on said pivot pin of said slider in face-to-face relation to said protractor, said member being pivotally adjustable about said pivot axis for setting said third edge to a desired angular position relative to said second edge, and two fastening means mounted on said slider for individually securing said protractor means and said member in said respective positions.

3. A tool-bit gauge, comprising an elongated body structure having a planar front face and forming a straight first edge in the plane of said front face and parallel to the longitudinal direction of said structure, a bar rigidly joined with said structure and extending transverse to said first edge, said bar forming a straight slide way perpendicular to said first edge, a slider mounted on said bar and having pivot means defining a pivot axis perpendicular to said plane, said slider being displaceable along said slide way for setting said pivot axis to a desired spacing from said first edge, two protractors each having a substantially diametrical straight edge and both being coaxially and rotatably mounted on said pivot means of said slider in face-to-face relation to each other and adjacent and parallel to said front-face plane of said structure, said protractors being individually adjustable about said pivot axis for setting each of said protractor edges to a desired angle relative to said first edge.

4. A tool-bit gauge, comprising a body structure having a planar front face and forming a straight first edge in the plane of said front face and parallel to the longitudinal direction of said structure, a bar rigidly joined with said structure and extending transverse to said first edge, said bar forming a straight slide way perpendicular to said first edge, a slider mounted on said bar and having pivot means defining a pivot axis perpendicular to said plane, said slider being displaceable along said slide way for setting said pivot axis to a desired spacing from said first edge, a protractor mounted on said pivot means of said slider adjacent to said structure and parallel to said front face plane of said structure, said protractor having a second straight edge and being selectively adjustable about said pivot axis for setting said second edge to a desired angular position relative to said first edge, and an arm pivotally mounted on said slider in face-to-face relation to said protractor and angularly adjustable about said pivot axis, said arm having a third straight edge and having a reference mark correlated to said protractor for setting said third edge to a desired angular position relative to said second edge.

5. A tool gauge, comprising a body having a plane front face and having a first straight edge, said body having a slide bar at a right angle to said first edge, a slider displaceably mounted on said bar, a screw spindle mounted on said body in parallel relation to said bar and in threaded engagement with said slider for adjusting the setting of said slider relative to said first edge, said slider having a bore and a pivot pin traversing said bore and defining a pivot axis perpendicular to the plane of said front face, protractor means fixed to and mounted on said pivot pin adjacent and in face-to-face relation to said front face of said body, said protractor means having a second straight edge and being pivotally adjustable about said pivot axis for setting said second edge to a desired angular portion relative to said first edge, a member having a straight third edge and being mounted on said pivot pin in front of and in face-to-face relation to said protractor means, said member being pivotally adjustable about said pivot axis for setting said third edge to a desired angular position relative to said second edge, said protractor means being mounted on said pivot pin and said pin having a threaded end in the back of said slider and a nut on said threaded end and for tightening said protractor means against said slider with said second edge set to its desired angular position, said member being revolvably seated on said pin and said pin having a threaded end in front of said slider and a nut on said front end for tightening said member against said protractor means with said third edge set to its desired angular position.

References Cited in the file of this patent

UNITED STATES PATENTS

| | | |
|---|---|---|
| 51,248 | Wells | Nov. 28, 1865 |
| 1,574,846 | Ordway | Mar. 2, 1926 |

FOREIGN PATENTS

| | | |
|---|---|---|
| 874,336 | France | Apr. 27, 1942 |
| 904,282 | France | Feb. 19, 1945 |
| 913,589 | Germany | June 14, 1954 |